US011977760B1

(12) United States Patent
Weiler et al.

(10) Patent No.: US 11,977,760 B1
(45) Date of Patent: May 7, 2024

(54) SECURE DATA AND INSTRUCTION LOADING

(71) Applicant: Idaho Scientific LLC, Boise, ID (US)

(72) Inventors: Andrew James Weiler, Nampa, ID (US); Nathan Charles Chrisman, Nampa, ID (US); Claude Harmon Garrett, V, Meridian, ID (US); Dale Weston Reese, Boise, ID (US); Matthew Ryan Waltz, Boise, ID (US); Jay Takeji Hirata, Meridian, ID (US)

(73) Assignee: IDAHO SCIENTIFIC LLC, Boise, ID (US)

( * ) Notice: Subject to any disclaimer, the term of this patent is extended or adjusted under 35 U.S.C. 154(b) by 0 days.

(21) Appl. No.: 18/244,060

(22) Filed: Sep. 8, 2023

(51) Int. Cl.
*G06F 3/06* (2006.01)
(52) U.S. Cl.
CPC ............ *G06F 3/064* (2013.01); *G06F 3/0623* (2013.01); *G06F 3/0673* (2013.01)
(58) Field of Classification Search
None
See application file for complete search history.

(56) References Cited

U.S. PATENT DOCUMENTS

| | | | | |
|---|---|---|---|---|
| 2003/0097558 A1* | 5/2003 | England | ................. | G06F 21/57 |
| | | | | 713/155 |
| 2003/0097578 A1* | 5/2003 | England | .............. | G06F 21/6281 |
| | | | | 713/191 |
| 2016/0224799 A1* | 8/2016 | Uzun | ................. | G06F 21/6227 |
| 2018/0026800 A1* | 1/2018 | Munoz | ................ | G06F 12/1408 |
| 2021/0117577 A1* | 4/2021 | Robitaille | ............... | G06F 21/53 |

* cited by examiner

*Primary Examiner* — Kevin Verbrugge
(74) *Attorney, Agent, or Firm* — Workman Nydegger (57) ABSTRACT

Securely loading digital blocks into memory for consumption by a processor. A method includes, at a memory protection shim, receiving a digital block and a manifest for the digital block. The manifest includes a transformation key for the digital block. The transformation key is configured to be used for at least one of validating the digital block or decrypting the digital block. The manifest is encrypted. The method further includes decrypting the manifest to obtain the transformation keys. The method further includes using the transformation keys to perform at least one of validating or decrypting the digital block. The method further includes retransforming the digital block using a memory protection shim ephemeral key to perform at least one of creating an authentication tag or encrypting the digital block. The method further includes storing the retransformed digital block in memory.

20 Claims, 6 Drawing Sheets

SECURE DATA AND INSTRUCTION LOADING

This invention was made with government support under contract no. FA864921P1575 with FA8649, awarded by USAF RESEARCH LAB AFRL SBRK. The government has certain rights in the invention.

BACKGROUND

Computers and computing systems have affected nearly every aspect of modern living. Computers are generally involved in work, recreation, healthcare, transportation, entertainment, household management, etc. Further, computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Given the widespread use of computers and their interconnected nature, and particularly the use of computers in embedded systems, attacks on such systems by various actors have increased at an alarming rate. So called cyber-attacks do and will continue to put critical infrastructure at risk by targeting inherently vulnerable industrial control systems (ICS). Additionally, due to the connected nature of even many simple user devices, home and business users are at risk for having large numbers of items they own at risk, including everything from the most mundane items to having embedded systems therein to more complex systems such as automobiles or home or business automation systems. Recent cyber-attacks have shown that cyber equipped adversaries are actively targeting industrial control infrastructure to achieve their goals. While attackers are pivoting to target vulnerabilities in ICS infrastructure, protection mechanisms have not adequately responded to protect ICS infrastructure.

The current approach in ICS and other security measures is insufficient in addressing the various adversaries. Industry is focused on perimeter defense, firewalls, and anti-virus solutions found in enterprise information technology (IT) techniques. Most of these are at best "bandages" and do not address the vulnerable mechanisms in computer hardware and software. Indeed, current computer architectures are generally inadequate for countering the various current attack vectors.

In particular, current computing architectures suffer from memory corruption vulnerabilities. The vulnerabilities are inherited from inadequacies in processors. For example, in a von Neumann architecture, there is no difference in storage of program instructions (sometimes referred to as 'code') and data. That is, memory and persistent storage (e.g., disk storage) store program instructions and data in blocks without regard to differentiating, either temporally or otherwise, in the memory and persistent storage, between program instructions and data. Thus, for example, data storage operations, including intentionally faulty operations, can be used to corrupt instruction blocks to cause operating errors or to inject known nefarious instructions. In sum, memory is simply not secure.

The subject matter claimed herein is not limited to embodiments that solve any disadvantages or that operate only in environments such as those described above. Rather, this background is only provided to illustrate one example technology area where some embodiments described herein may be practiced.

SUMMARY

One embodiment illustrated herein includes a method for securely loading digital blocks into memory for consumption by a processor. The method includes, at a memory protection shim, receiving a digital block and a manifest for the digital block. The manifest includes a transformation key for the digital block. The transformation key is configured to be used for at least one of validating the digital block or decrypting the digital block. The manifest is encrypted. At the memory protection shim, the method further includes decrypting the manifest to obtain the transformation keys. At the memory protection shim, the method further includes using the transformation keys to perform at least one of validating or decrypting the digital block. At the memory protection shim, the method further includes retransforming the digital block using a memory protection shim ephemeral key to perform at least one of creating an authentication tag or encrypting the digital block. The method further includes storing the retransformed digital block in memory.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which.

DETAILED DESCRIPTION

Embodiments illustrated herein may be implemented in the context of a system that obtains a digital block 114 (see FIG. 1), such as a digital block of instructions or data, from memory, and performs a transformation over the digital block 114 to ensure that the digital block 114 is trustworthy. If the digital block 114 is determined to be trustworthy, then the digital block 114 (including, in some embodiments, a plain text version 114' of the digital block 114) can be returned to a CPU core for consumption (e.g., execution in the case of instructions or data consumption operations in the case of data). In some embodiments, the results of the transformation may be used to determine if the digital block 114 is instructions or data.

Figure 1:
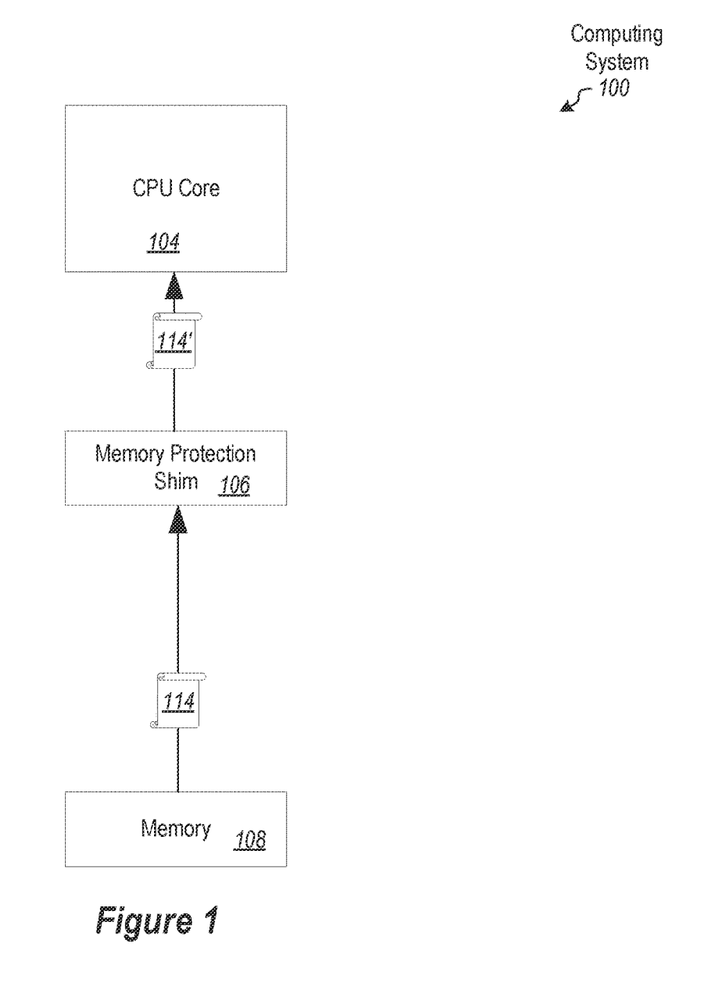
FIG. 1 illustrates an example of a system that securely uses digital blocks.

For example, a memory protection shim 106 may perform a transformation over the digital block 114, and based on the results of the transformation over the digital block 114, determine (and distinguish) that the digital block 114 is one, and only one, of instruction(s), data, or invalid. If the digital block 114 is determined to be instruction(s), then the digital block 114 (including a plain text version 114' of the digital block 114) can be returned to a CPU core 104 for consumption by execution. If the digital block 114 is determined to be data, then the digital block 114 (including a plain text version 114' of the digital block 114) can be returned to a CPU core 104 for consumption as data. If the digital block 114 is determined to be invalid, then the digital block 114 is prevented from being provided to the CPU core 104, or at least prevented from being consumed by the CPU core 104.

Note that the transformation is performed within a security boundary of a memory protection shim 106 such that transformation is performed at a time and/or location where external modifications on the block are prevented. That is, the transformation is performed at a point when the data is immutable. For example, with reference to FIG. 1, embodiments may be implemented where an apparatus includes a CPU core 104, configured to execute instructions and consume data, and a memory 108, configured to store the instructions and the data. A memory protection shim 106 is coupled to the CPU core 104 and the memory 108. The memory protection shim 106 is configured to perform transformations over digital blocks to perform at least one of authentication or decryption of the digital blocks received from the memory 108. The memory protection shim 106 is coupled to the CPU core 104 in a fashion that prevents egress of the digital blocks or ingress of other external digital blocks between the memory protection shim 106 and the CPU core 104.

Note that for the memory protection shim 106 to perform the transformation in a fashion that validates or decrypts the digital block, the digital block 114 is stored in the memory 108 in a particular secure fashion that allows for securely loading the digital block 114. That is, the digital block 114 is securely loaded into the memory 108 in the context of the transformation operations performed by the memory protection shim 106.

Figure 2:
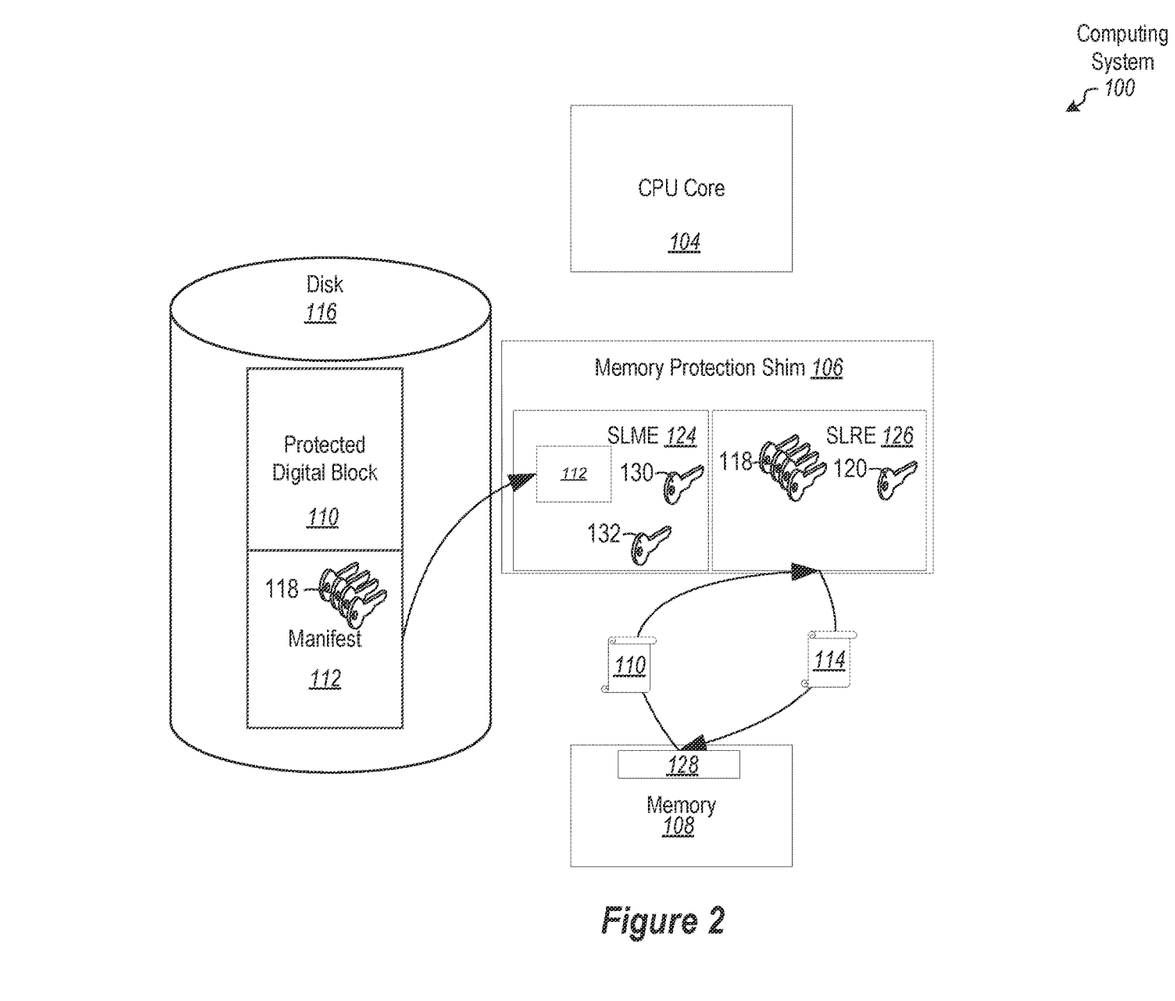
FIG. 2 illustrates an example of a system that securely loads digital blocks into memory.

Reference is now made to FIG. 2, which illustrates a general example of a computing system 100 securely loading a digital block into the memory 108. A memory protection shim 106 receives a protected digital block 110. As will be illustrated in more detail below, the protected digital block 110 is protected, such as by encryption or other processing, by a digital block publisher (see e.g., digital block publisher 400 in FIG. 4). The digital block publisher also creates a manifest 112 for the protected digital block 110, where the manifest 112 includes transformation keys 118 used by the memory protection shim 106 for validating and/or decrypting the digital block 110. Note that while a plurality of transformation keys 118 are illustrated, in some embodiments, a single transformation key may be used.

Note that while the protected digital block 110 is illustrated as being on disk 116, the protected digital block 110 can be received by the memory protection shim 106 from a number of different locations. For example, in some embodiments, the protected digital block 110 is received by the CPU Core 104 obtaining the protected digital block 110 from the disk 116 and providing it to the memory protection shim 106. In another example, the protected digital block 110 may have been previously stored in the memory 108 by the CPU core 104 retrieving the protected digital block 110 from some other location. In some embodiments, certain headers (discussed in more detail below) may be used to determine where (e.g., address locations) portions of the protected digital block 110 should be stored in virtual and/or physical memory.

The manifest 112 may also be provided to the memory protection shim 106. Again, this may be facilitated in one or more of a number of ways. For example, the CPU core 104 may retrieve the manifest 112 from the disc 116 and provide the manifest 112 to the memory protection shim 106. Alternatively, the CPU core 104 may store the manifest 112 in memory 108 as part of an initialization process, and later retrieve the manifest 112 from the memory 108 and provide the manifest 112 to the memory protection shim 106.

The manifest 112 includes transformation keys 118 for the protected digital block 110. The transformation keys 118 are configured to be used for at least one of validating the protected digital block 110 or decrypting the protected digital block 110. The manifest 112 is encrypted. In a typical embodiment, the manifest 112 is encrypted using asymmetric key encryption. In one example, a digital block publisher encrypts or otherwise transforms the protected digital block 110 such that the protected digital block 110 can be decrypted and/or validated using the transformation keys 118. As noted, the transformation keys 118 are loaded into the manifest 112. The manifest 112 has two layers of encryption/signing protection, which are discussed in more detail below. Briefly, however, in one layer, a digital block publisher encrypts the manifest to protect the transformation keys 118 using a first public key of a first public key/private key pair, where the memory protection shim holds a first private key 130 of the first public key/private key pair. In a second layer, the digital block publisher signs the manifest 112 using a second private key of a second public key/private key pair, which is used to verify the publisher of the digital block 110. The memory protection shim uses a second public key of the second public key/private key pair to verify the digital block publisher.

At the memory protection shim 106, the manifest 112 is decrypted, using the first private key 130 to obtain the transformation keys 118. The memory protection shim 106 uses the transformation keys 118 to perform at least one of validating or decrypting the protected digital block 110. In a decryption example, the memory protection shim 106 decrypts the protected digital block 110 in a fashion that allows data and/or code in the protected digital block 110 to be read in a plain text format. In a validation scenario, the memory protection shim 106 applies the transformation keys 118 to data and/or code in the protected digital block 110 to perform an operation to attempt to obtain a known result. For example, embodiments may use keys for use with Message Authentication code (MAC) algorithms where a known output is expected. If the known output is not obtained when an MAC algorithm is applied to the protected digital block 110, then it can be determined that the protected digital block 110 has been tampered with or damaged.

The memory protection shim 106 transforms the protected digital block 110 to the memory protection shim protected digital block 114 using a memory protection shim key 120 to perform at least one of creating an authentication tag (by signing) or encrypting the protected digital block 110. For example, an authentication tag may be an expected answer when performing a given MAC algorithm on the memory protection shim protected digital block 114. In an alternative example, the protected digital block 110 can be transformed to the memory protection shim protected digital block 114 such that the memory protection shim protected digital block 114 is protected using a different key than the protected digital block 110. In particular, the digital block 110 is protected by the keys 118, while the digital block 114 is protected by the key 120.

In some embodiments, the memory protection shim key 120 is an ephemeral key of the memory protection shim 106. Typically, an ephemeral key is created by the memory protection shim 106 on startup of the memory protection shim 106 and is valid so long as the memory protection shim 106 continues to operate without interruption. If the memory protection shim 106 is disabled, shut down, tampered with, and/or otherwise changed, the ephemeral memory protection shim key 120 will no longer be valid. Additionally, key rollover or key replacement is a process in the context of CPU memory encryption, specifically designed to enhance security by regularly updating the encryption keys used to protect the contents of memory. This automatic and background process ensures that the keys used for encrypting data in memory are periodically replaced, limiting the window of opportunity for attackers to extract sensitive information through side-channel attacks. In such cases, the digital block 110 will need to be reloaded into memory and retransformed to create the digital block 114.

The memory protection shim 106 stores the retransformed memory protection shim protected digital block 114 in the memory. The memory protection shim protected digital block 114 can then be operated on in a fashion such as that illustrated in FIG. 1.

In some embodiments, storing the memory protection shim protected digital block 114 in the memory comprises storing the memory protection shim protected digital block 114 in a same location in the memory from which the protected digital block 110 was received. In particular, as noted previously, the CPU core 104 can retrieve the protected digital block 110 from the disc 116 and store the protected digital block 110 in the memory 108. Often, this can be done using headers such as executable and linkable format (ELF) headers which are used to define virtual memory addresses and/or physical memory addresses where the various portions of the data or application should be stored. These headers are typically associated with code and/or data blocks by a software and/or data publisher. Thus, in some embodiments, it may be desirable to ensure that digital blocks, whether in the form of blocks such as the protected digital block 110 or the protected digital block 114 are placed in the appropriate location in the memory 108 as specified in the header. The memory protection shim 106 stores portions of the digital block 114 in the same locations as the corresponding portions of the digital block 110.

Figure 3:
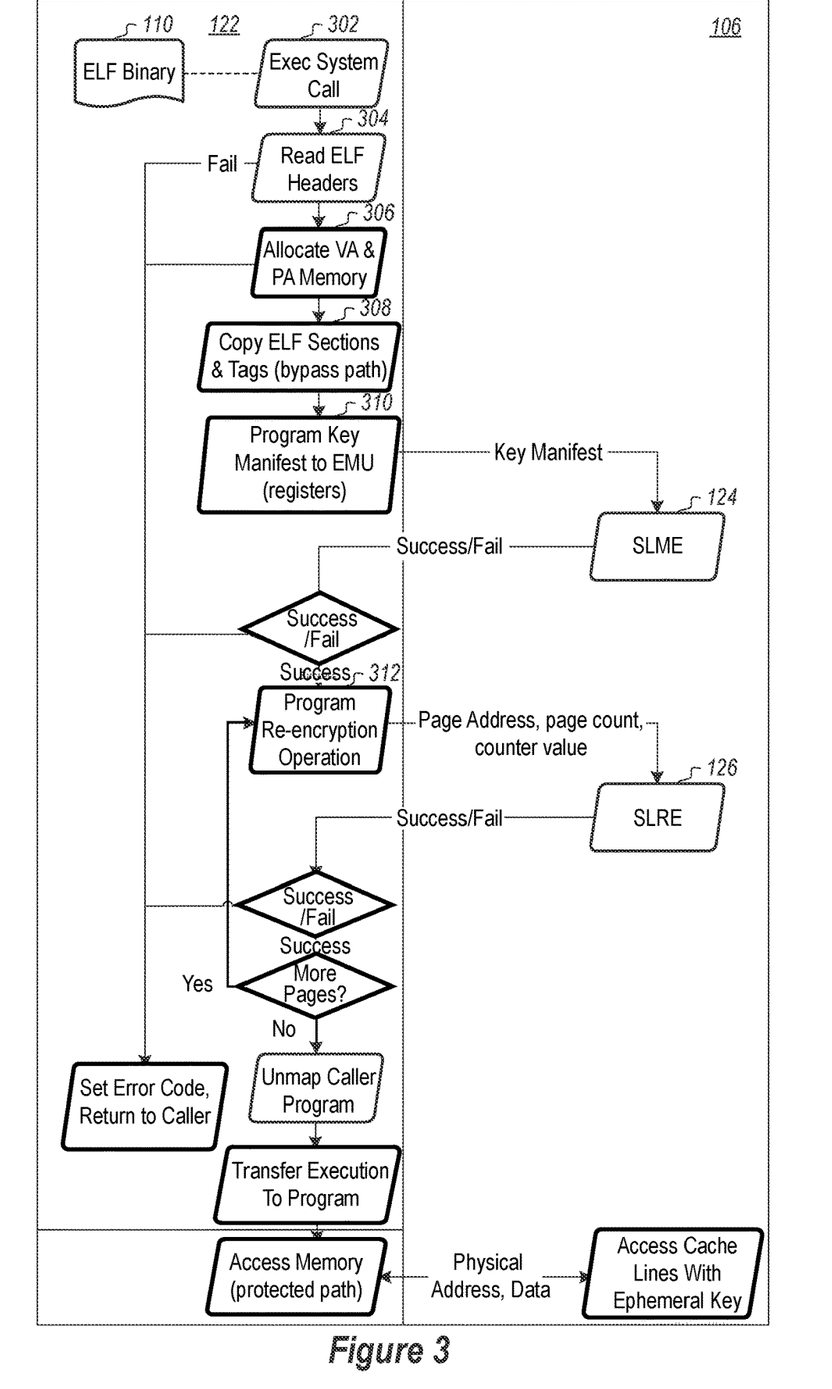
FIG. 3 illustrates a flow for securely loading digital blocks into memory.

Referring now to FIG. 3, an example flow 300 illustrating a secure load process is illustrated. FIG. 3 illustrates the flow 300 between software 122 and the memory protection shim 106. The software 122, in the illustrated example, is being executed by the CPU core 104, although in other embodiments, other computing entities may execute the software 122. In some embodiments, the software 122 may be operating system software running on the CPU core 104.

As illustrated at 302, a system call is executed to obtain the protected digital block 110. As discussed previously, the protected digital block 110 may be in one example an ELF binary. In other embodiments, the protected digital block 110 may be other executable code and/or data. In the example where the protected digital block 110 is an ELF binary, the protected digital block 110 will include ELF headers that include indications where the various portions of the protected digital block 110 should be stored where the indications include virtual memory addresses and/or physical memory addresses in memory. As illustrated at 304, the software 122 reads the ELF headers in the digital block 110. As illustrated at 306, the software 122 will allocate virtual address space and physical address space in the memory 108. In one particular example, the ELF headers assign virtual address locations to the various portions of the digital block 110. When the software 122 and CPU core 104 store the various portions of the digital block 110 to the memory 108, physical memory addresses are correlated to the virtual memory addresses in the ELF headers. This can be used, as discussed in more detail below, to prevent tampering with the digital block 110 (or the digital block 114) by entities attempting to move or change portions of the digital block 110 or digital block 114.

As illustrated at 308, the software 122 naively copies sections tag and other bits (such as ID indicator bits and any nonce bits) of the encrypted binary into system memory 108. Note that the software 122 does not need to decrypt the protected digital block 110 at this point, but rather just copies the bits as-is in the encrypted protected digital block 110. In some embodiments, the sections and tags may be copied using an offset address. In particular, it is possible to add offsets to the ELF's embedded addresses because the application was compiled for a generic layout and the software loader is positioning the program for a specific layout. This adds flexibility for targeting platforms with varying amounts of memory and protected memory. This also accommodates virtual memory management where the application's load-location is decided at runtime; an offset is chosen at runtime and added to all the application's addresses to position the application somewhere in free/allocated memory.

As illustrated at 310, the software 122 sends the manifest 112 to a secure load manifest engine 124 at the memory protection shim 106. This can be done by placing the manifest in one or more registers at the memory protection shim 106. As noted, the manifest 112 includes the transformation keys 118 for decrypting and/or verifying the sections of the digital block 110. The manifest 112 is encrypted using asymmetric RSA (or similar) cryptography, such as RSA 3072. In particular, the memory protection shim 106 has a private key 130 for decrypting the manifest 112. The manifest 112 will have been encrypted using the corresponding public key 412 (discussed in more detail below in conjunction with the description of FIG. 4) by a digital block publisher 400 (i.e., a software or data publisher). As discussed below, this allows the digital block publisher 400 to publish specifically for a particular, specific, instance of hardware. Note that in some embodiments, private keys may be serialized on a per hardware device basis. That is, a digital block publisher can publish a digital block for use only with a specific instance of a memory protection shim (or other hardware). Alternatively, private keys may be on a per hardware batch basis. In this case, a digital block publisher can publish digital blocks that can only be used with particular instances of hardware from a certain batch of hardware devices. Alternatively, private keys may be on a per hardware manufacturer basis. In this case, a digital block publisher can publish digital blocks that can only be used with particular instances of hardware from a certain particular manufacturer.

The secure load manifest engine 124 decrypts the manifest 112 as described earlier and determines if the manifest is authentic or not authentic. In particular, the secure load manifest engine 124 uses a first private key 130 of a first private key/public key pair to decrypt the manifest. The secure load manifest engine can use a second public key 132 of a second public key private key pair to determine if the manifest is authentic or not authentic. If the manifest is decrypted and the manifest is authentic, the secure load manifest engine 124 provides an indicator to the software 122 indicating success. Otherwise, the secure load manifest engine 124 provides an indicator to the software 122 indicating failure.

As a result of the secure load manifest engine 124 providing an indicator indicating success, the software 122 initiates a re-encryption process as illustrated at 312. In particular, the software 122 writes into registers in the secure load re-encryption engine 126 of the memory protection shim 106 an indication of the pages of the digital block 110, at an identified address, relevant to the manifest 112. That is, the software provides relevant virtual address information from the manifest 112 and physical address information generated as a result of storing the digital block 110 into memory 108 for the various portions of the digital block 110. With this information, the secure load re-encryption engine 126 re-encrypts and/or generates verification information using the ephemeral memory protection shim key 120. In particular, the secure load re-encryption engine 126 reads in portions of the protected digital block 110 from a location 128 in the memory 108 and writes corresponding portions of the digital block 114 back to the same location 128 in the memory 108.

Thus, the digital block 110 is read from the memory 108 using the keys 118 and the read instructions or data from the digital block 110 in the location 128 in the memory 108 are re-encrypted using the ephemeral key 120 to create encrypted or verified instructions or data that is written back to the same location 128 in the memory 108 as the digital block 114. In some embodiments, the keys 118 and key 120 are used for the same type of encryption, although with different key values, such that the digital block 110 is the same size as the digital block 114, allowing the digital block 114 to be placed on the same memory location as the digital block 110. Note that in some embodiments, the digital block 110 and digital block 114 may include only data that needs to be validated and not decrypted and encrypted. In this case, the keys 118 can be used to validate an authentication tag (such as by computing a hash using the keys 118 and the data in the digital block 110) associated with the digital block 110, whereas the key 120 can be used to generate a new authentication tag for the digital block 114.

One advantage of using the hardware secure load, where encryption is performed by the memory protection shim 106 is that confidentiality of software code in the digital block 110, received from a software vendor, can be maintained, even from a system running the software code in the digital block 110. Thus, a form of digital rights management can be implemented to prevent access to readable software code from purchasers or licensees of the software code. In particular, the memory 108 does not have generally readable software code stored for the digital block 110 or the digital block 114. Rather, the memory protection shim 106 can decrypt the digital blocks 110 and 114. But the memory protection shim 106 will re-encrypt the software code into the digital block 114 before the software code leaves the memory protection shim 106 to be stored in the memory 108, or the decrypted code will be provided to the CPU core in a fashion that prevents egress of the digital block or ingress of other external digital blocks between the memory protection shim and the CPU core. This can allow for enforcing restrictions in a system where a user may have rights to run software, but does not have rights to see the software.

In another example, advantages can be obtained where publishers can contribute to a software project where different publishers can use each other's functionality, but where the software code itself is confidential as between the various publishers. Thus, for example, publishers can provide encrypted libraries that are not readable by other publishers or other entities, but are useable by system using encrypted libraries from multiple different publishers.

Figure 4:
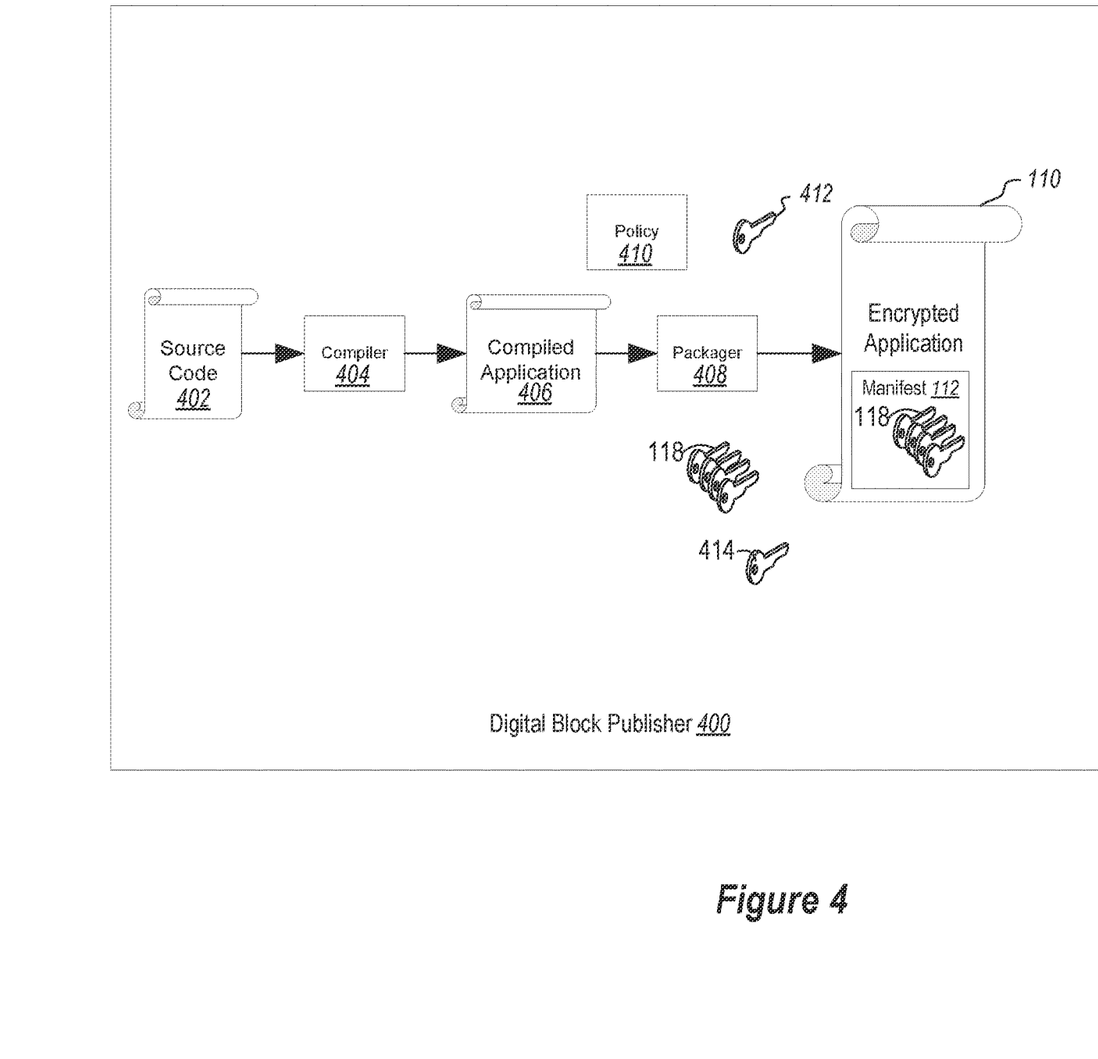
FIG. 4 illustrates a system for securely publishing digital blocks.

Referring now to FIG. 4, details are illustrated showing how software and data is published by a publisher. In the Example illustrated in FIG. 4, software is published by a digital block publisher 400 where the software is encrypted. However, in other embodiments, data may be published, where the data is provided with authentication tags such as MAC algorithm authentication tags.

FIG. 4 illustrates that source code 402 is compiled by a compiler 404 to create a compiled application 406. The compiled application may be, for example, an ELF binary.

A packager 408, which may be implemented using various computing hardware and software running on the computer hardware, encrypts the compiled application 406 to the digital block 110 (in this case, an encrypted application) and produces the manifest 112 according to policy 410. In particular, with respect to policy, the publisher may choose to encode additional hardware enforced restrictions in the manifest. For example, the publisher can indicate to hardware that it should cut-off debug access to the CPU before loading a program, or furthermore requiring that debug has been locked-out/disabled since reset in order to load a program. Alternatively, the publisher can indicate that exact hardware revisions and build options are required to load a program. While it is optional to enable some of these security features, the publisher may want a hardware-backed assurance that the instructions and data will both be encrypted and signed, and that lesser configurations are not sufficient. This can be enforced by policy.

The packager 408 encrypts the compiled application to produce the digital block 110 using the keys 118, which are also included in the manifest 112. The manifest 112 is encrypted using the public key 412 of the public key/private key pair that includes the public key 412 and the private key 130 shown in FIG. 2. That is, a software (or data) publisher uses a public key of a public key/private key pair for the entity to which the publisher is publishing the digital block. In this case, as the memory protection shim 106 is the particular instance of hardware to which the digital block 110 is being published, a public key/private key pair specific to the memory protection shim 106 is used.

In some embodiments, the digital block publisher 400 randomly generates the keys 118.

The digital block publisher 400 can use its own public key/private key pair to sign the manifest 112 so that the memory protection shim 106 can validate the manifest 112, and thus the digital block 110, as coming from the digital block publisher. In particular, FIG. 4 illustrates that the digital block publisher uses a private key 414 to sign the manifest 112. As illustrated in FIG. 2, the secure load manifest engine 124 can use the corresponding public key 132 to validate the signature on the manifest 112.

As illustrated previously, embodiments illustrated herein are compatible with digital blocks implementing statically compiled software. Statically compiled software is software that has a fixed memory layout meaning that each piece of the application goes to the same place in system memory each time the application is loaded. As noted above, this can be accomplished by the digital block publisher assigning virtual memory addresses to the various portions of the digital block in the manifest 112. The memory protection shim uses the key 120 for creating authentication tags which include physical memory location information for the portions of the digital block 114 that are placed into the memory 108. Thus, the address of where a portion is in the memory 108 is cryptographically tied to the location in the memory 108. This prevents successful attacks where portions of the digital block are overwritten. The threat is stopped by tying the physical addresses into the authentication tag. Software in the manifest knows where each portion of the block goes. The portions of the block are encrypted to a virtual address space. The software 122 notifies the secure load re-encryption engine 126 where each portion exists in virtual memory and physical memory.

Figure 5:
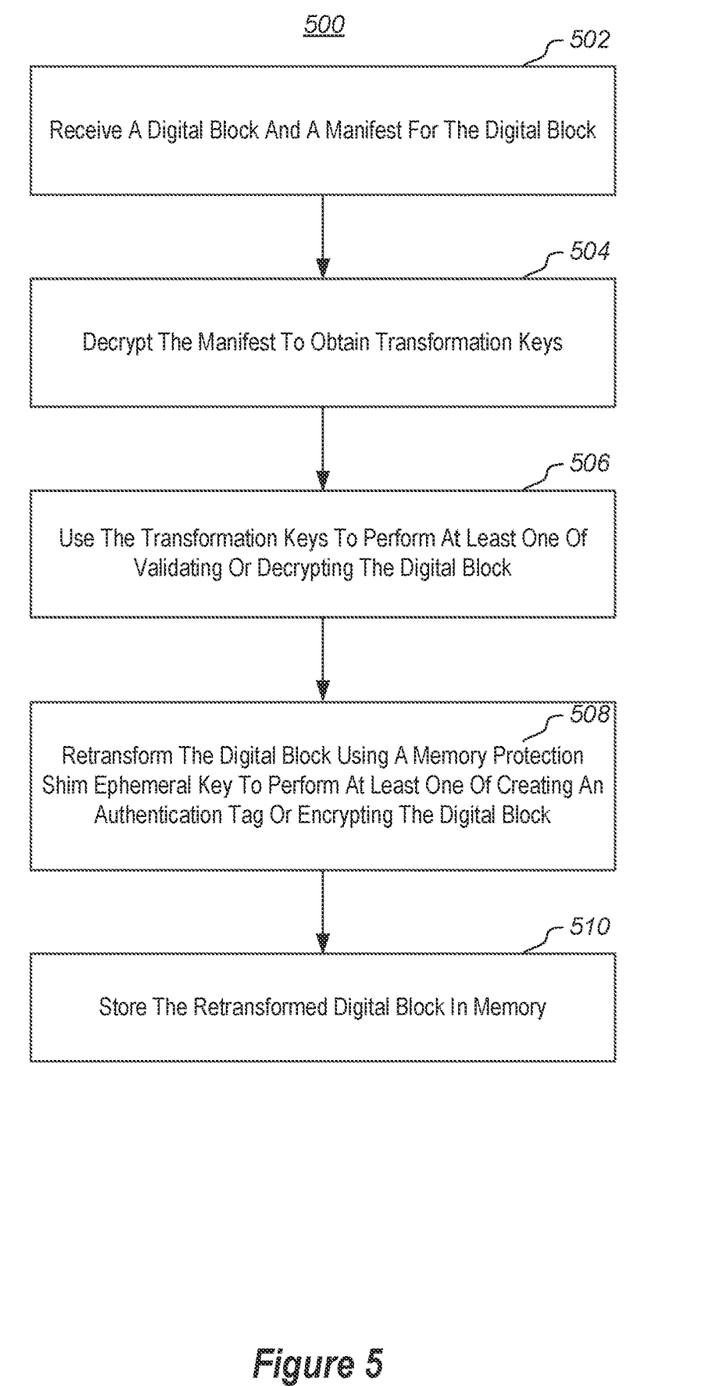
FIG. 5 illustrates a method for securely loading digital blocks into memory for consumption by a processor.

Referring now to FIG. 5, a method 500 is illustrated. The method 500 includes acts for securely loading digital blocks, such as data or executable code, into memory for execution by a processor. The method includes at a memory protection shim, receiving a digital block and a manifest for the digital block (act 502). The manifest comprises a transformation key for the digital block. The transformation key is configured to be used for at least one of validating the digital block or decrypting the digital block. The manifest is encrypted.

The method 500 further includes, at the memory protection shim, decrypting the manifest to obtain the transformation keys (act 504).

The method 500 further includes, at the memory protection shim, using the transformation keys to perform at least one of validating or decrypting the digital block (act 506).

The method 500 further includes, at the memory protection shim, retransforming the digital block using a memory protection shim ephemeral key to perform at least one of creating an authentication tag or encrypting the digital block (act 508).

The method 500 further includes, storing the retransformed digital block in memory (act 510).

The method 500 may be practiced where storing the retransformed digital block in the memory comprises storing the retransformed digital block in a same location in the memory from which the digital block was received.

The method 500 may be practiced where using the transformation keys to perform at least one of validating or decrypting the digital block comprises validating a virtual memory address location for the digital block. For example, validation of a virtual address for the virtual address may be based on determining that the digital block is stored in a virtual address specified in an ELF header.

The method 500 may be practiced where retransforming the digital block comprises adding a physical address location to the authentication tag. For example, when the digital block is placed in physical memory, an authentication tag may be generated based on the physical memory location.

The method 500 may be practiced where decrypting the manifest comprises decrypting the manifest using a private key of a public key/private key pair, where a public key of the public key/private key pair was used to encrypt the manifest. The public key/private key pair may be created on a per hardware manufacturer basis, per hardware device basis, per hardware device batch basis, or other basis which hardware manufacturers and software or data developers agree.

Figure 6:
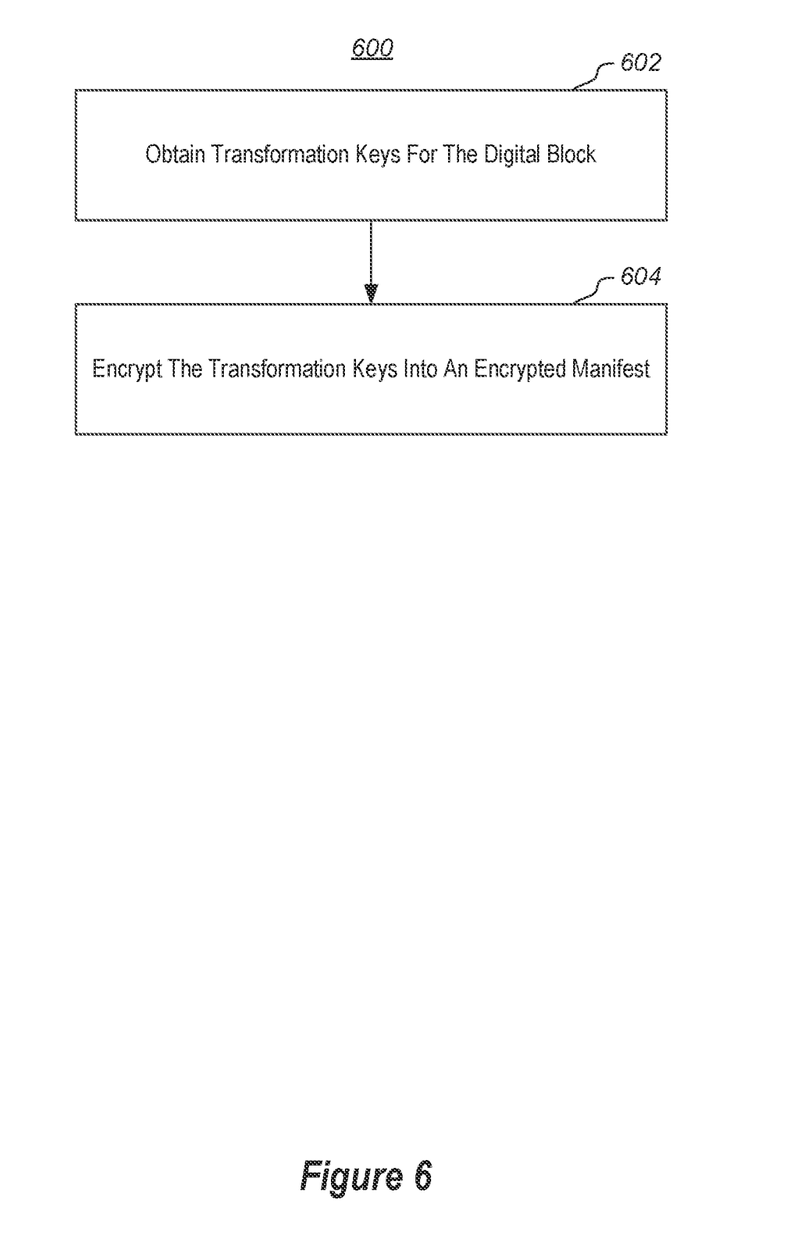
FIG. 6 illustrates a method for transforming digital blocks for securely loading digital blocks into memory.

Referring now to FIG. 6, a method 600 is illustrated. The method 600 includes acts for transforming a digital block for securely loading the digital block into memory for execution by a processor. The method 600 includes obtaining transformation keys for the digital block (act 602). The transformation keys are configured for performing at least one of validating or encrypting the digital block. The method further includes encrypting the transformation keys into an encrypted manifest (act 604).

The method 600 may be practiced where encrypting the manifest comprises encrypting the manifest using a public key of a public key/private key pair, where the private key is held by a memory protection shim.

The method 600 may further include signing the manifest using a software public key, allowing the hardware to validate the manifest.

Embodiments of the disclosure may comprise or utilize a special-purpose or general-purpose computer system that includes computer hardware, such as, for example, a processor system and system memory, as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module, and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

It will be appreciated that the disclosed systems and methods may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (SaaS), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. Such embodiments may include a data processing device comprising means for carrying out one or more of the methods described herein; a computer program comprising instructions which, when the program is executed by a computer, cause the computer to carry out one or more of the methods described herein; and/or a computer-readable medium comprising instructions which, when executed by a computer, cause the computer to carry out one or more of the methods described herein. The described embodiments are to be considered in all respects only as illustrative and not restrictive. All changes which come within the meaning and range of equivalency of the claims are to be embraced within their scope.

What is claimed:

1. A method for securely loading digital blocks into memory for consumption by a processor, the method comprising:
    at a memory protection shim, receiving a digital block and a manifest for the digital block, wherein the manifest comprises a transformation key for the digital block, the transformation key configured to be used for at least one of validating the digital block or decrypting the digital block, and wherein the manifest is encrypted;
    at the memory protection shim, decrypting the manifest to obtain the transformation key;
    at the memory protection shim, using the transformation key to perform at least one of validating or decrypting the digital block;
    at the memory protection shim, retransforming the digital block using a memory protection shim ephemeral key to perform at least one of creating an authentication tag or encrypting the digital block; and
    storing the retransformed digital block in memory.

2. The method of claim 1, wherein storing the retransformed digital block in the memory comprises storing the retransformed digital block in a same location in the memory from which the digital block was received.

3. The method of claim 1, wherein using the transformation key to perform at least one of validating or decrypting the digital block comprises validating a virtual memory address location for the digital block.

4. The method of claim 1, wherein retransforming the digital block comprises adding a physical address location to the authentication tag.

5. The method of claim 1, wherein decrypting the manifest comprises decrypting the manifest using a private key of a public key/private key pair, where a public key of the public key/private key pair was used to encrypt the manifest.

6. The method of claim 5, wherein the public key/private key pair is created on a per hardware manufacturer basis.

7. The method of claim 5, wherein the public key/private key pair is created on a per hardware device basis.

8. A non-transitory physical computer-readable medium comprising computer executable instructions that when executed by one or more processors causes the one or more processors to perform the following:
- at a memory protection shim, receiving a digital block and a manifest for the digital block, wherein the manifest comprises a transformation key for the digital block, the transformation key configured to be used for at least one of validating the digital block or decrypting the digital block, and wherein the manifest is encrypted;
- at the memory protection shim, decrypting the manifest to obtain the transformation key;
- at the memory protection shim, using the transformation key to perform at least one of validating or decrypting the digital block;
- at the memory protection shim, retransforming the digital block using a memory protection shim ephemeral key to perform at least one of creating an authentication tag or encrypting the digital block; and
- storing the retransformed digital block in memory.

9. The non-transitory physical computer-readable medium of claim 8, wherein storing the retransformed digital block in the memory comprises storing the retransformed digital block in a same location in the memory from which the digital block was received.

10. The non-transitory physical computer-readable medium of claim 8, wherein using the transformation key to perform at least one of validating or decrypting the digital block comprises validating a virtual memory address location for the digital block.

11. The non-transitory physical computer-readable medium of claim 8, wherein retransforming the digital block comprises adding a physical address location to the authentication tag.

12. The non-transitory physical computer-readable medium of claim 8, wherein decrypting the manifest comprises decrypting the manifest using a private key of a public key/private key pair, where a public key of the public key/private key pair was used to encrypt the manifest.

13. The non-transitory physical computer-readable medium of claim 12, wherein the public key/private key pair is created on a per hardware manufacturer basis.

14. The non-transitory physical computer-readable medium of claim 12, wherein the public key/private key pair is created on a per hardware device basis.

15. A computing system comprising:
- one or more processors; and
- one or more computer-readable media coupled to the one or more processors, the computer-readable media comprising computer executable instructions that when executed by one or more processors causes the one or more processors to perform the following:
- at a memory protection shim, receiving a digital block and a manifest for the digital block, wherein the manifest comprises a transformation key for the digital block, the transformation key configured to be used for at least one of validating the digital block or decrypting the digital block, and wherein the manifest is encrypted;
- at the memory protection shim, decrypting the manifest to obtain the transformation key;
- at the memory protection shim, using the transformation key to perform at least one of validating or decrypting the digital block;
- at the memory protection shim, retransforming the digital block using a memory protection shim ephemeral key to perform at least one of creating an authentication tag or encrypting the digital block; and
- storing the retransformed digital block in memory.

16. The computing system of claim 15, wherein storing the retransformed digital block in the memory comprises storing the retransformed digital block in a same location in the memory from which the digital block was received.

17. The computing system of claim 15, wherein using the transformation key to perform at least one of validating or decrypting the digital block comprises validating a virtual memory address location for the digital block.

18. The computing system of claim 15, wherein retransforming the digital block comprises adding a physical address location to the authentication tag.

19. The computing system of claim 15, wherein decrypting the manifest comprises decrypting the manifest using a private key of a public key/private key pair, where a public key of the public key/private key pair was used to encrypt the manifest.

20. The computing system of claim 19, wherein the public key/private key pair is created on a per hardware manufacturer basis or on a per hardware device basis.

* * * * *